United States Patent
Li et al.

(10) Patent No.: US 11,218,226 B2
(45) Date of Patent: Jan. 4, 2022

(54) QUANTUM COMMUNICATION SYSTEMS HAVING DISPERSION COMPENSATING OPTICAL FIBER LINKS

(71) Applicant: CORNING INCORPORATED, Corning, NY (US)

(72) Inventors: Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 54 days.

(21) Appl. No.: 16/557,059

(22) Filed: Aug. 30, 2019

(65) Prior Publication Data

US 2020/0007242 A1 Jan. 2, 2020

Related U.S. Application Data

(63) Continuation of application No. PCT/US2018/020350, filed on Mar. 1, 2018.
(Continued)

(51) Int. Cl.
*H04B 10/12* (2006.01)
*H04B 10/70* (2013.01)
(Continued)

(52) U.S. Cl.
CPC .............. *H04B 10/70* (2013.01); *H04B 10/25* (2013.01); *H04B 10/2507* (2013.01);
(Continued)

(58) Field of Classification Search
CPC .... H04B 10/70; H04B 10/25; H04B 10/2507; H04B 10/2513; H04B 10/25133;
(Continued)

(56) References Cited

U.S. PATENT DOCUMENTS 6,445,864 B2 * 9/2002 Jiang ................. G02B 6/02261
385/127
6,466,721 B1 10/2002 Tsukitani et al.
(Continued)

FOREIGN PATENT DOCUMENTS

EP 1257076 A1 11/2002
WO 2015050623 A2 4/2015
(Continued)

OTHER PUBLICATIONS

International Search Report and Written Opinion of the International Searching Authority; PCT/US2018/020350; dated Jun. 21, 2018; 11 Pages; Korean Intellectual Property Office.
(Continued)

*Primary Examiner* — Hanh Phan
(74) *Attorney, Agent, or Firm* — Svetlana Z. Short

(57) ABSTRACT

A quantum communications system includes a quantum key generation system having a photonic quantum bit generator, a dispersion compensating optical fiber link, and a photon detector unit and a communications network having a signal generator, a signal channel, and a signal receiver. The dispersion compensating optical fiber link extends between and optically couples the photonic quantum bit generator and the photon detector unit. Further, the dispersion compensating optical fiber link is structurally configured to induce dispersion at an absolute dispersion rate of about 9 ps/(nm)km or less and induce attenuation at an attenuation rate of about 0.18 dB/Km or less such that the quantum key bit information of a plurality of photons output by the one or more photonic quantum bit generators is receivable at the photon detector unit at a bit rate of at least about 10 Gbit/sec.

20 Claims, 8 Drawing Sheets

Related U.S. Application Data

(60) Provisional application No. 62/465,423, filed on Mar. 1, 2017.

(51) Int. Cl.
| | |
|---|---|
| *H04B 10/2513* | (2013.01) |
| *H04B 10/2525* | (2013.01) |
| *H04B 10/2507* | (2013.01) |
| *H04L 9/08* | (2006.01) |
| *H04B 10/25* | (2013.01) |

(52) U.S. Cl.
CPC ..... *H04B 10/2513* (2013.01); *H04B 10/2525* (2013.01); *H04B 10/2572* (2013.01); *H04B 10/25133* (2013.01); *H04L 9/0852* (2013.01)

(58) Field of Classification Search
CPC ............ H04B 10/2525; H04B 10/2572; H04L 9/0858; H04L 9/0852; G02B 6/0228; G02B 6/03633; G02B 6/02042
USPC ... 398/141, 142, 147, 158, 159, 81, 79, 183, 398/188, 173, 180, 181, 135, 136, 137, 398/138, 139, 202, 208; 380/256, 278, 380/282, 255, 44, 277; 385/123, 124, 385/126, 127
See application file for complete search history.

(56) References Cited

U.S. PATENT DOCUMENTS

| | | | | |
|---|---|---|---|---|
| 8,855,316 | B2* | 10/2014 | Wiseman | H04L 9/0855 380/278 |
| 9,313,180 | B1 | 4/2016 | Gray et al. | |
| 2005/0111803 | A1 | 5/2005 | Bickham | |
| 2005/0185906 | A1 | 8/2005 | Bickham et al. | |
| 2006/0257071 | A1* | 11/2006 | Bise | G02B 6/03688 385/29 |
| 2007/0116418 | A1 | 5/2007 | Mishra | |
| 2010/0226659 | A1 | 9/2010 | Nishioka et al. | |
| 2013/0163759 | A1* | 6/2013 | Harrison | H04L 9/0852 380/268 |
| 2014/0355998 | A1* | 12/2014 | Tanzilli | H04L 9/0852 398/141 |
| 2015/0316713 | A1* | 11/2015 | Yamamoto | G02B 6/02276 385/127 |
| 2015/0372768 | A1* | 12/2015 | Dynes | H04B 10/70 398/188 |
| 2018/0198608 | A1* | 7/2018 | Nordholt | H04B 10/70 |

FOREIGN PATENT DOCUMENTS

| | | |
|---|---|---|
| WO | 2016204847 A2 | 12/2016 |
| WO | 2018/160781 A1 | 9/2018 |

OTHER PUBLICATIONS

Mora et al.; "Dispersion Supported BB84 Quantum Key Distribution Using Phase Modulated Light"; IEEE Photonics Journal, vol. 3, No. 3, Jun. 2011; pp. 433-440.

Sangouard et al.; "Quantum Repeaters Based on Atomic Ensembles and Linear Optics," Review of Modern Physics, vol. 83, 2011, pp. 34-73.

Alberto Boaron et al: "Secure quantum key distribution over 421 km of optical fiber", arxiv.org, Cornell University Library, 201 Olin Library Cornell University Ithaca, NY 14853 Jul. 9, 2018 (Jul. 9, 2018).

European Patent Application No. 18761869.9 Supplementary European search report dated Dec. 7, 2020; 11 Pages; European Patent Office.

Hasegawa et al., "Experimental realization of quantum cryptosystem over 87 km", Quantum Electronics and Laser Science, Jun. 1-6, 2003, pp. 1-2.

Hua-Lei Yin et al: "Measurement device independent quantum key distribution over 404 km optical fibre", arxiv.org, Cornell University Library, 201 Olin Library Cornell University Ithaca, NY 14853 Jun. 22, 2016 (Jun. 22, 2016).

International Search Report and Written Opinion of the International Searching Authority; PCT/US2019/060989 dated Apr. 17, 2020, 11 pages; European Patent Office.

Nishioka et al., "Single-Photon Interference Experiment Over 80 km With a Pulse-Driven Heralded Single-Photon Source", IEEE Photonics Technology Letters, vol. 20, No. 5, Mar. 1, 2008, pp. 354-356.

Ozhegov R et al: "Quantum key distribution over 300", Proceedings of SPIE/IS & T vol. 9440, Dec. 18, 2014 (Dec. 18, 2014), p. 94401F-94401F.

Shu et al., "Effects of loss and dispersion on fiber-based quantum key distribution", Proc. of Spie., vol. 7136, Nov. 11, 2008, p. 71360B-1-71360B-8.

Stucki D et al., "High rate, long-distance quantum key dirstibution over 250 km of ultra low loss fibres", New Journal of Physics, Institute of Physics Publishing, Bristol, GB, vol. 11, No. 7, Jul. 1, 2009 (Jul. 1, 2009), p. 75003.

Takesue et al., "Quantum key distribution over a 40-dB channel loss using superconducting single-photon detectors", Jun. 1, 2007, pp. 343-348.

Mora et al., "Dispersion Supported BB84 Quantum Key Distribution Using Phase Modulated Light" In IEEE Photonics Journal, vol. 3, No. 3, Jun. 2011, 9 Pages.

* cited by examiner

QUANTUM COMMUNICATION SYSTEMS HAVING DISPERSION COMPENSATING OPTICAL FIBER LINKS

CROSS-REFERENCE TO RELATED APPLICATIONS

This application is a continuation of International Application No. PCT/US2018/020350, filed on Mar. 1, 2018, which claims the benefit of priority of U.S. Provisional Application Ser. No. 62/465,423 filed on Mar. 1, 2017 the contents of which are relied upon and incorporated herein by reference in their entirety as if fully set forth below.

BACKGROUND

The present disclosure relates to quantum communication systems having dispersion compensating optical fiber links. More specifically, the present disclosure relates to quantum communication systems that include a quantum key generation system with components optically coupled using dispersion compensating optical fiber links for providing increased quantum key bit rates.

BRIEF SUMMARY

According to the subject matter of the present disclosure a quantum communications system includes a quantum key generation system having a photonic quantum bit generator, a dispersion compensating optical fiber link, and a photon detector unit and a communications network having a signal generator, a signal channel, and a signal receiver. The dispersion compensating optical fiber link extends between and optically couples the photonic quantum bit generator and the photon detector unit. The photonic quantum bit generator is structurally configured to output a plurality of photons each including quantum key bit information. The photon detector unit is structurally configured to receive the quantum key bit information of the plurality of photons. The signal channel extends between and communicatively couples the signal generator and the signal receiver. The signal generator is structurally configured to output a signal comprising one or more signal bits. The signal receiver is communicatively coupled to the photon detector unit and is structurally configured to compare the one or more signal bits with the quantum key bit information upon receipt of the signal. Further, the dispersion compensating optical fiber link includes a core and a cladding surrounding the core and is structurally configured to induce dispersion of a photon comprising a wavelength of about 1550 nm at an absolute dispersion rate of about 9 ps/(nm)km or less and induce attenuation of the photon comprising the wavelength of about 1550 nm at an attenuation rate of about 0.18 dB/Km or less such that the quantum key bit information of the plurality of photons output by the photonic quantum bit generator are receivable at the photon detector unit at a bit rate of at least about 10 Gbit/sec.

In accordance with one embodiment of the present disclosure a quantum key generation system including a dispersion compensating optical fiber link extending between and optically coupling a photonic quantum bit generator and a photon detector unit. The dispersion compensating optical fiber link has a core and a cladding surrounding the core and is structurally configured to induce dispersion of a photon comprising a wavelength of about 1550 nm at an absolute dispersion rate of about 9 ps/(nm)km or less and induce attenuation of the photon comprising the wavelength of about 1550 nm at an attenuation rate of about 0.18 dB/Km or less such that quantum key bit information of a plurality of photons output by the photonic quantum bit generator is receivable at the photon detector unit at a bit rate of at least about 10 Gbit/sec.

In accordance with yet another embodiment of the present disclosure, a quantum key generation system includes two photon entanglement chains, a plurality of dispersion compensating optical fiber links, and two photon detector units. Each photon entanglement chain extends between the two photon detector units. Each photon entanglement chain includes at least one photonic quantum bit generator and first and second terminating quantum memories optically coupled using the plurality of dispersion compensating optical fiber links. The first and second terminating quantum memories are positioned at first and second ends of the photon entanglement chains, respectively. The first and second terminating quantum memories of each of the two photon entanglement chains form first and second cross-chain quantum repeaters, respectively, to generate measurable entangled particles at the cross-chain quantum repeaters. Further, the first and the second photon detector units are structurally configured to receive the measurable entangled particles generated by the first and second cross-chain quantum repeaters, respectively.

Although the concepts of the present disclosure are described herein with primary reference to quantum key generation, it is contemplated that the concepts will enjoy applicability to any quantum information communication.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
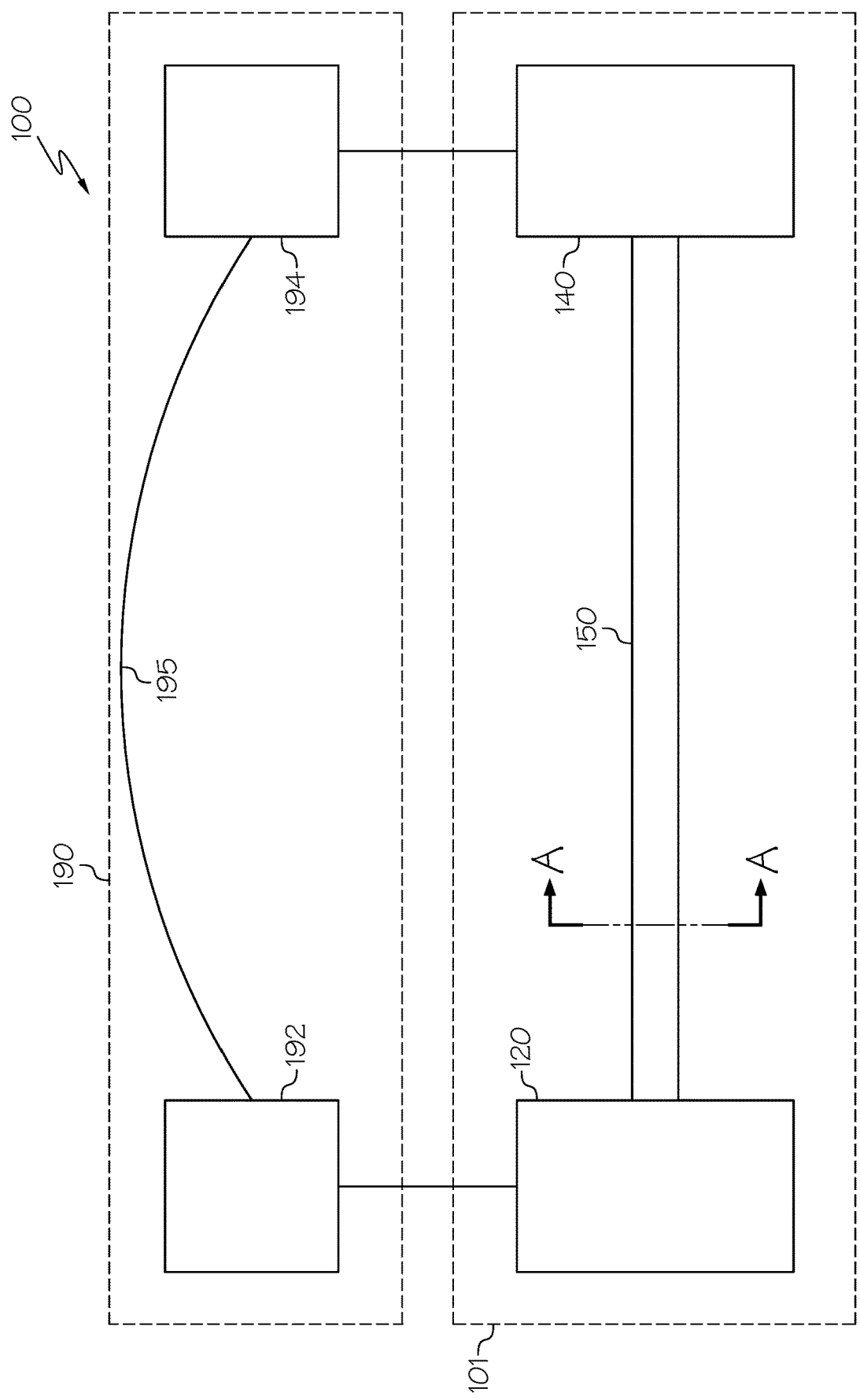
FIG. 1 schematically depicts a quantum communications system including a quantum key generation system and a communications network, according to one or more embodiments shown and described herein.

Referring now to FIG. 1, a quantum communications system 100 comprising a quantum key generation system 101 and a communications network 190 is schematically depicted. The quantum key generation system 101 includes a photonic quantum bit generator 120, a photon detector unit 140 and a dispersion compensating optical fiber link 150 that extends between and optically couples the photonic quantum bit generator 120 and the photon detector unit 140. The communications network 190 comprises a signal generator 192, a signal receiver 194, and a signal channel 195 that extends between and communicatively couples the signal generator 192 and the signal receiver 194. Further, the signal receiver 194 is communicatively coupled to the photon detector unit 140, communicatively coupling the quantum key generation system 101 to the communications network 190.

Referring still to FIG. 1, the photonic quantum bit generator 120 of the quantum key generation system 101 is structurally configured to output a plurality of photons each comprising a quantum key bit and the photon detector unit 140 is structurally configured to determine quantum key bit information upon receipt of at least one of the plurality of photons. The quantum key bit information may comprise a cryptographic key which may be used to decode encrypted messages transferred using the communications network 190. Further, the signal generator 192 of the communications network 190 is structurally configured to output a signal comprising one or more signal bits, which may comprise portions of an encrypted message, and the signal receiver 194 is structurally configured to compare the one or more signal bits with the quantum key bit information upon receipt of the signal, for example, to decode the encrypted message using the cryptographic key comprising the quantum key bit information. In some embodiments, the quantum key generation system 101 may be may be an entanglement based quantum key generation system 201 having one or more quantum repeaters 230 that uses photon entanglement to propagate quantum key bit information (FIGS. 5A-5C) and in other embodiments, the quantum key generation system 101 may propagate quantum key bit information without photon entanglement, for example, quantum key generation system 301 (FIG. 6).

In operation, the plurality of photons comprising quantum key bits may traverse the dispersion compensating optical fiber link 150 between the photonic quantum bit generator 120 and the photon detector unit 140. The dispersion compensating optical fiber link 150 is structurally configured to induce dispersion of a plurality of photons traversing the dispersion compensating optical fiber link 150 such that the temporal pulse width of each photon of the plurality of photons traversing the dispersion compensating optical fiber link 150 is less than the pulse spacing distance between adjacent photons. As used herein, the "temporal pulse width" is the full width half maximum (FWHM) of the peak intensity of each photon pulse. Further, as used herein "pulse spacing distance" is the distance between a pulse center of adjacent photon pulses, where the pulse center corresponds with the peak intensity of each photon pulse. For example, in some embodiments, the dispersion compensating optical fiber link 150 may be structurally configured to maximize broadening of the temporal pulse width of each photon pulse without overlapping an adjacent photon pulse.

Figure 2:
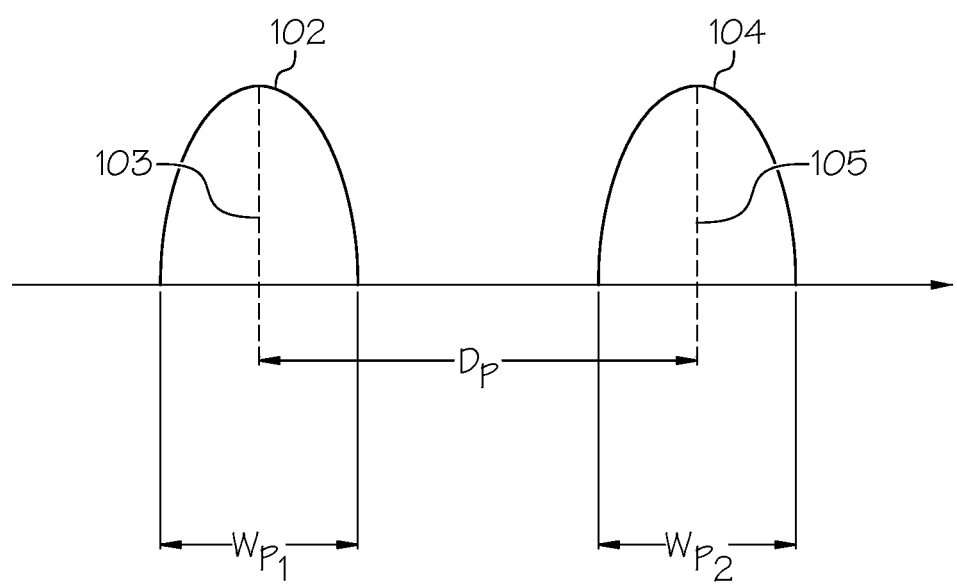
FIG. 2 schematically depicts a pair of photon pulses, according to one or more embodiments shown and described herein.

Referring now to FIG. 2, a temporal pulse width $W_{P1}$, of a first photon pulse 102 and a temporal pulse width $W_{P2}$ of a second photon pulse 104 are schematically depicted. The first photon pulse 102 and the second photon pulse 104 are example photons output by the photonic quantum bit generator 120 that are adjacently positioned and propagating along the dispersion compensating optical fiber link 150. The first photon pulse 102 comprises a pulse center 103 corresponding with the peak intensity of the first photon pulse 102 and the second photon pulse 104 comprises a pulse center 105 corresponding with the peak intensity of the second photon pulse 104. Further, the pulse center 103 of the first photon pulse 102 is spaced from the pulse center 105 of the second photon pulse 104 by a pulse spacing distance $D_P$. As shown in FIG. 2A, the pulse spacing distance between the first photon pulse 102 and the second photon pulse 104 is larger than the temporal pulse width $W_{P1}$, $W_{P2}$ of each photon pulse 102, 104 such that the first and second photon pulses 102, 104 do not overlap. As a non-limiting example, the temporal pulse width may be from about 20 ps to about 200 ps, for example, about 30 ps, 40 ps, 50 ps, 60 ps, 70 ps, 80 ps, 90 ps, 100 ps, 110 ps, 120 ps, 120 ps, 130 ps, 140 ps, 150 ps, 160 ps, 170 ps, 180 ps, 190 ps, or the like.

Figure 3A:
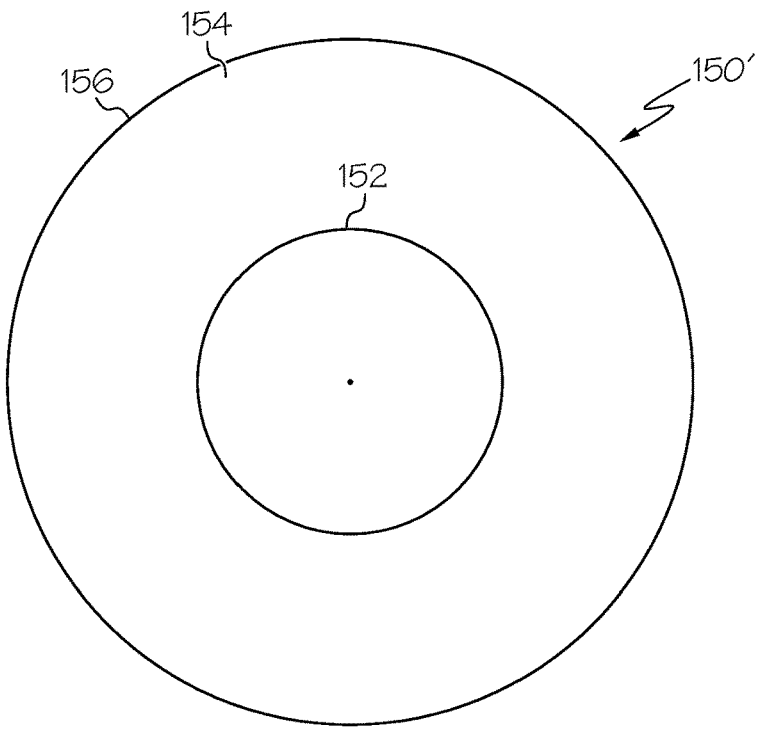
FIG. 3A schematically depicts a cross sectional view of an embodiment of the dispersion compensating optical fiber link of FIG. 1, according to one or more embodiments shown and described herein.

Referring now to FIGS. 3A-4B, the dispersion compensating optical fiber link 150 is depicted in more detail. FIGS. 3A and 4A each depict cross sections of embodiments of the dispersion compensating optical fiber link 150 of FIG. 1 along line A-A. In particular, FIG. 3A, depicts a dispersion compensating optical fiber link 150' comprising a core 152 and a cladding 154 surrounding the core 152. FIG. 4A depicts a dispersion compensating optical fiber link 150" that also comprises the core 152 and the cladding 154 surrounding the core 152 and further comprises a cladding ring 155 disposed within the cladding 154, separating the cladding 154 into a first cladding portion 154a, positioned between the cladding ring 155 and the core 152 and a second cladding portion 154b. Further, FIGS. 3B and 4B each depict a graph of refractive index as a function of radius of the dispersion compensating optical fiber links 150', 150" of FIGS. 3A and 3B, respectively.

Referring again to FIGS. 3A and 4A, the core 152 may comprise silica glass, polymer or the like and may be doped with K, Cl, F, or a combination thereof. While not intending to be limited by theory, doping the core 152 may reduce the viscosity and the fictive temperature of the core 152. The cladding 154 includes an outer cladding surface 156 and may comprise pure silica, F-doped silica, F (fluorine)/B (boron) co-doped silica, low index polymer, or the like. Doping the cladding 154 with F may lower the refractive index of the cladding 154. Further, the cladding 154 comprises a lower refractive index than the core 152 to facilitate total internal reflection of a plurality of photons propagating through the dispersion compensating optical fiber link 150.

Figure 4A:
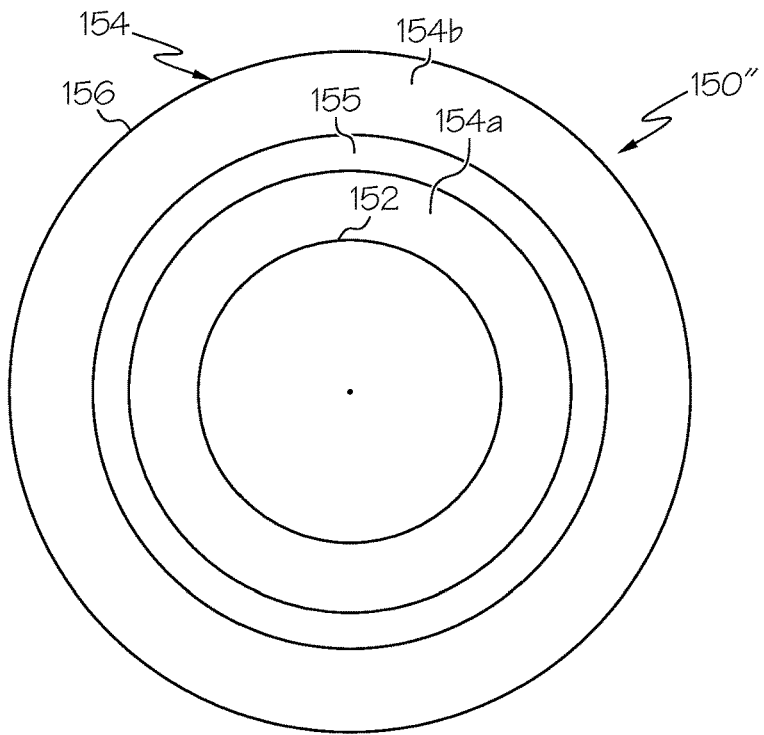
FIG. 4A schematically depicts a cross sectional view of another embodiment of the dispersion compensating optical fiber link of FIG. 1, according to one or more embodiments shown and described herein.

In the embodiments depicted in FIGS. 3A and 4A, the dispersion compensating optical fiber links 150', 150" comprise a single core 152, however, in other embodiments, the dispersion compensating optical fiber links 150', 150" may comprise multiple cores. In embodiments comprising multiple cores, the multiple cores may be spun and the dispersion compensating optical fiber link 150 may comprise any spin configuration, such as a unidirectional spin configuration, a bidirectional spin configuration, or the like. Further, in some embodiments, the dispersion compensating optical fiber links 150', 150" may comprise a step index profile, a parabolic index profile, a graded index profile, a triangular index profile, or the like.

Referring again to FIGS. 3A and 3B, the core 152 of the dispersion compensating optical fiber link 150' may comprise a radius $R_{CORE}$ of from about 1.5 µm to about 5 µm, for example, 2 µm to about 4 µm, 2.2 µm to about 3 µm, or the like. For example, 2.23 µm, 2.28 µm, 2.3 µm, 2.35 µm, 2.4 µm, 2.45 µm, 2.5 µm, 2.55 µm, 2.58 µm, 2.6 µm, 2.65 µm, 2.7 µm, 2.75 µm, 2.8 µm, 2.85 µm, 2.9 µm, 2.95 µm, or the like. The core 152 of dispersion compensating optical fiber link 150' comprises a refractive index $n_1$ and a relative refractive index $\Delta_1$ (which is relative to a refractive index $n_s$ of pure silica and denotes the refractive index change between pure silica an the core 152). The relative refractive index $\Delta_1$ comprises $(n_1-n_s)/n_s$. As stated above, the core 152 may be pure silica glass or glass doped with Cl, or K, or F for low loss. As non-limiting examples, the relative refractive index $\Delta_1$ may be from about −0.1 to about 0.2, or the like, for example, −0.1, −0.05, 0, 0.05, 0.1, 0.15, or the like. The cladding 154 comprises a refractive index $n_2$ and a relative refractive index $\Delta_2$ (which is relative to the refractive index $n_s$ of pure silica and denotes the refractive index change between pure silica and the core 152). The relative refractive index $\Delta_2$ comprises $(n_2-n_s)/n_s$. Further, $n_2<n_1$ and $\Delta_2<\Delta_1$. As non-limiting examples, the relative refractive index $\Delta_2$ may be from about −0.4 to about −0.7, or the like, for example, −0.45, −0.5, −0.55, −0.6 −0.65, or the like.

Further, the dispersion compensating optical fiber link 150' comprises a relative refractive index change $\Delta$ between the core 152 and the cladding 154 of from about 0.3 to about 0.8, where $\Delta=\Delta_1-\Delta_2$. As non-limiting examples, the refractive index change $\Delta$ may be from about 0.4 to about 0.7, 0.5 to about 0.65, or the like, for example, 0.35, 0.4, 0.45, 0.5, 0.55, 0.6, 0.65, 0.7, 0.75, or the like. Further, including a dopant in the core 152, the cladding 154, or both, (e.g., an updopant or a downdopant) may alter the relative refractive index between the core 152 and the cladding 154, i.e. alter the refractive index change $\Delta$. As used herein, an "updopant" is a dopant which has a propensity to raise the refractive index relative to pure undoped $SiO_2$ and a "downdopant" is a dopant which has a propensity to lower the refractive index relative to pure undoped $SiO_2$.

Figure 3B:
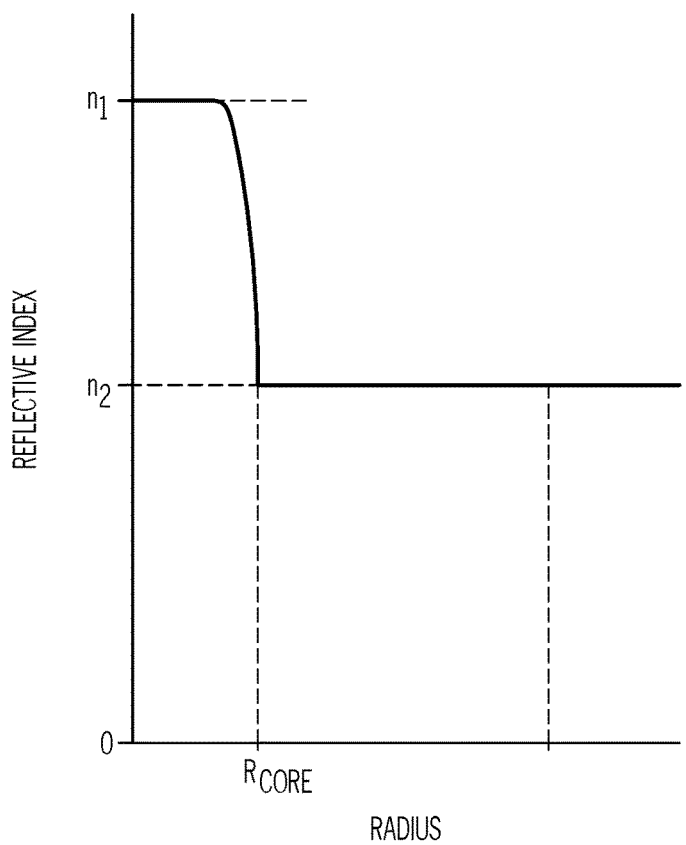
FIG. 3B graphically depicts refractive index of as a function of radius of the dispersion compensating optical fiber link of FIG. 3A, according to one or more embodiments shown and described herein.

Referring still to FIGS. 3A and 3B, the dispersion compensating optical fiber link 150' may comprise a cutoff wavelength of about 1200 nm or less, for example, 1150 nm, 1100 nm, 1050 nm, 1031 nm, 1025 nm, 1000 nm, 975 nm, 973 nm, 950 nm, 929 nm, 925 nm, 915 nm, 911 nm, 909 nm, 905 nm, 900 nm, 875 nm, 850 nm, 825 nm, 800 nm, or the like. While not intending to be limited by theory, the cutoff wavelength is a wavelength above which guided higher order modes are no longer supported within the core 152 and the core 152 becomes a single mode core supporting only the fundamental mode. In operation, when one or more photons comprising a wavelength of about 1550 nm propagate along the dispersion compensating optical fiber link 150', the dispersion compensating optical fiber link 150' induces a mode field diameter of from about 6.5 µm to about 10 µm, for example, about 7 µm to about 9.5 µm, 7.5 µm to about 9.0 µm, 7 µm to about 8.5 µm, or the like, such as 6 µm, 6.5 µm, 7 µm, 7.5 µm, 8 µm, 8.5 µm, 9 µm, 9.5 µm, 10 µm, or the like. While not intending to be limited by theory, the mode field diameter is the transverse extent of the optical intensity distribution of the fundamental mode of the core 152 of the dispersion compensating optical fiber link 150'.

Further, when one or more photons comprising a wavelength of about 1550 nm propagate along the dispersion compensating optical fiber link 150', the dispersion compensating optical fiber link 150' induces an effective area of from about 30 µm² to about 70 µm², for example, about 35 µm² to about 60 µm², about 40 µm² to about 55 µm², from about 45 µm² to about 50 µm², or the like, such as 30 µm², 35 µm², 40 µm², 45 µm², 50 µm², 55 µm², 60 µm², 65 µm², 70 µm², 75 µm², 80 µm², or the like. While not intending to be limited by theory, the effective area is the cross sectional area over which the energy of the electric field of the fundamental mode of light propagating along the dispersion compensating optical fiber link 150' is distributed within the core 152. For example, the effective area of a single mode optical fiber is related to the maximum energy the core 152 can carry without inducing non-linear type signal penalties.

Referring still to FIGS. 3A and 3B, when one or more photons comprising a wavelength of about 1550 nm propagate along the dispersion compensating optical fiber link 150', the dispersion compensating optical fiber link 150' induces dispersion of the one or more photons of an absolute dispersion rate of about 9 ps/(nm)km or less, for example about 8.6 ps/(nm)km or less, 8.5 ps/(nm)km or less, 8 ps/(nm)km or less, 7.5 ps/(nm)km or less, 7 ps/(nm)km or less, 6.5 ps/(nm)km or less, 6 ps/(nm)km or less, 5.7 ps/(nm)km or less, 5.5 ps/(nm)km or less, 5 ps/(nm)km or less, 4.5 ps/(nm)km or less, 4.5 ps/(nm)km or less, 4 ps/(nm)km or less, 3.6 ps/(nm)km or less, 3.5 ps/(nm)km or less, 3 ps/(nm)km or less, 2.5 ps/(nm)km or less, 2 ps/(nm)km or less, 1.5 ps/(nm)km or less, 1.1 ps/(nm)km, 1 ps/(nm)km or less, 0.5 ps/(nm)km or less, 0.1 ps/(nm)km or less, or the like. While not intending to be limited by theory, the absolute dispersion rate is the rate at which the photon pulse spreads outward from the pulse center 103 (FIG. 2), e.g., rate of increase of the temporal pulse width of the photon pulse.

Further, when one or more photons comprising a wavelength of about 1550 nm propagate along the dispersion compensating optical fiber link 150', the dispersion compensating optical fiber link 150' induces a dispersion slope of from about 0.05 ps/(nm²)km to about 0.055 ps/(nm²)km, for example, about 0.051 ps/(nm²)km to about 0.054 ps/(nm²)km, such as about 0.0515 ps/(nm²)km, 0.0516 ps/(nm²)km, 0.0518 ps/(nm²)km, 0.052 ps/(nm²)km, 0.0521 ps/(nm²)km, 0.0525 ps/(nm²)km, 0.053 ps/(nm²)km, 0.0535 ps/(nm²)km, 0.0538 ps/(nm²)km or the like. While not intending to be limited by theory, the dispersion slope is the rate at which the absolute dispersion rate changes with wavelength. Smaller dispersion slope may be desired for flat dispersion over a wide wavelength window. Moreover, when one or more photons comprising a wavelength of about 1550 nm propagate along the dispersion compensating optical fiber link 150', the dispersion compensating optical fiber link 150' induces an attenuation rate of about 0.2 dB/Km or less, for example, about 0.18 dB/Km or less, such as about 0.17 dB/Km, 0.16 dB/Km, 0.15 dB/Km, 0.14 dB/Km, 0.13 dB/Km, 0.12 dB/Km, or the like. While not intending to be limited by theory, the attenuation rate is rate of intensity loss (e.g., photon loss) of a plurality of photons propagating along the dispersion compensating optical fiber link 150'.

Tables 1 and 2, below, each list attributes of examples of the dispersion compensating optical fiber links 150' of FIGS. 3A and 3B.

TABLE 1

|  | First Example Dispersion Compensating Optical Fiber Link 150' | Second Example Dispersion Compensating Optical Fiber Link 150' | Third Example Dispersion Compensating Optical Fiber Link 150' |
| --- | --- | --- | --- |
| Core Material | Pure Silica | Pure Silica | Pure Silica |
| Relative Refractive Index $\Delta_1$ | 0 | 0 | 0 |
| Relative Refractive Index $\Delta_2$ | −0.5 | −0.55 | −0.6 |
| Index Profile | Step | Step | Step |
| Core Radius $R_{CORE}$ (μm) | 2.9 | 2.58 | 2.5 |
| Cutoff Wavelength (nm) | 1031 | 948 | 972 |
| Mode Field Diameter at 1550 nm (μm) | 8.5 | 8.3 | 7.8 |
| Effective Area at 1550 nm (μm$^2$) | 53.8 | 51.1 | 45.4 |
| Absolute Dispersion Rate at 1550 nm (ps/(nm)km) | 8.6 | 5.7 | 3.6 |
| Dispersion Slope at 1550 nm (ps/(nm$^2$)km) | 0.053 | 0.0518 | 0.0516 |
| Attenuation Rate at 1550 nm (dB/Km) | 0.17 or less | 0.17 or less | 0.17 or less |

TABLE 2

|  | Fourth Example Dispersion Compensating Optical Fiber Link 150' | Fifth Example Dispersion Compensating Optical Fiber Link 150' | Sixth Example Dispersion Compensating Optical Fiber Link 150' |
| --- | --- | --- | --- |
| Core Material | Pure Silica | Chlorine Doped Silica | Chlorine Doped Silica |
| Relative Refractive Index $\Delta_1$ | 0 | 0.1 | 0.15 |
| Relative Refractive Index $\Delta_2$ | −0.65 | −0.5 | −0.5 |
| Index Profile | Step | Step | Step |
| Core Radius $R_{CORE}$ (μm) | 2.28 | 2.35 | 2.23 |
| Cutoff Wavelength (nm) | 929 | 911 | 909 |
| Mode Field Diameter at 1550 nm (μm) | 7.6 | 8.0 | 7.6 |
| Effective Area at 1550 nm (μm$^2$) | 42.8 | 47 | 43.4 |
| Absolute Dispersion Rate at 1550 nm (ps/(nm)km) | 0.1 | 1.1 | −0.8 |
| Dispersion Slope at 1550 nm (ps/(nm$^2$)km) | 0.0521 | 0.0538 | 0.0530 |
| Attenuation Rate at 1550 nm (dB/Km) | 0.17 or less | 0.17 or less | 0.17 or less |

Figure 4B:
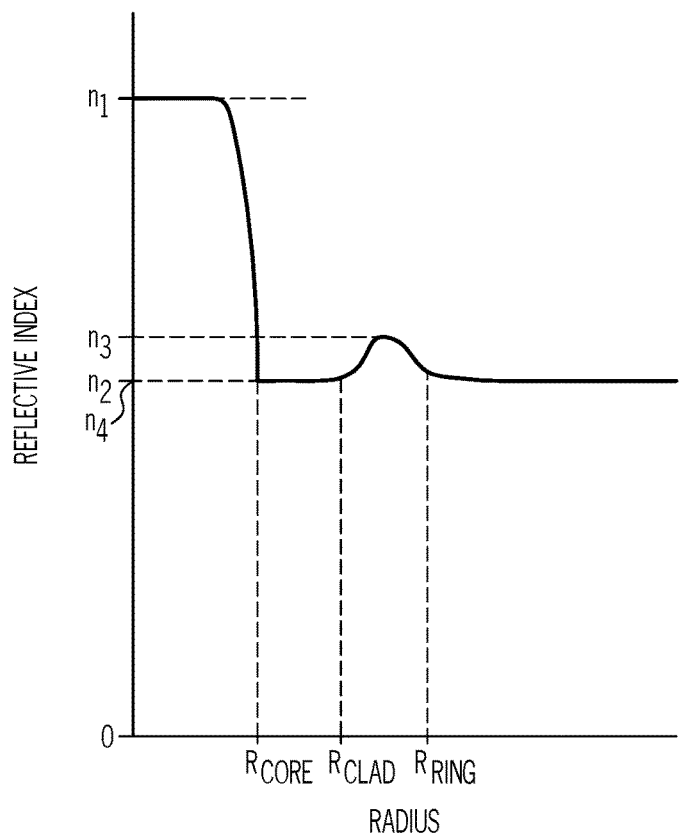
FIG. 4B graphically depicts refractive index of as a function of radius of the dispersion compensating optical fiber link of FIG. 4A, according to one or more embodiments shown and described herein.

Referring now to FIGS. 4A and 4B, the dispersion compensating optical fiber link 150" comprising the cladding ring 155 disposed within the cladding 154, between the first cladding portion 154a and the second cladding portion 154b, is schematically depicted (FIG. 4A) and graphically depicted (FIG. 4B). The core 152 of the dispersion compensating optical fiber link 150" may comprise a radius $R_{CORE}$ of from about 1.5 μm to about 5 μm, for example, 2 μm to about 4 μm, 2.2 μm to about 3 μm, 2.2 μm to about 2.8 μm, or the like, for example, 2.23 μm, 2.28 μm, 2.3 μm, 2.35 μm, 2.4 μm, 2.45 μm, 2.5 μm, 2.55 μm, 2.58 μm, 2.6 μm, 2.65 μm, 2.7 μm, 2.75 μm, 2.8 μm, 2.85 μm, 2.9 μm, 2.95 μm, or the like. The first cladding portion 154a of the dispersion compensating optical fiber link 150" comprises a radius $R_{CLAD}$ measured from an interface of the first cladding portion 154a and the cladding ring 155 of from about 3 μm to about 12 μm, for example about 4 μm to about 10 μm, 4.5 μm to 8.8 μm, or the like, such as 3 μm, 4 μm, 4.5 μm, 5 μm, 6 μm, 7 μm, 8 μm, 8.8 μm, 9 μm, 10 μm, 11 μm, 12 μm, or the like. Referring still to FIGS. 4A and 4B, the cladding ring 155 of the dispersion compensating optical fiber link 150" comprises a radius $R_{RING}$ measured from an interface of the cladding ring 155 and the second cladding portion 154b of from about 7 μm to about 13 μm, for example, 8 μm to about 12 μm, and about 9 μm to about 11.5 μm, or the like, such as, 7 μm, 7.5 um. 8 μm, 8.5 μm, 9 μm, 9.5 μm, 10 μm, 10.5 μm, 11 μm, 11.4 μm, 11.5 μm, 12 μm, 12.5 μm, 13 μm, or the like.

Referring still to FIGS. 4A and 4B, the core 152 of the dispersion compensating optical fiber link 150" comprises a refractive index $n_1$ and a relative refractive index $\Delta_1$ (which is relative to the refractive index $n_s$ of pure silica and denotes the refractive index change between pure silica and the core 152). The relative refractive index $\Delta_1$ comprises $(n_1 - n_s)/n_s$. The first cladding portion 154a comprises a refractive index $n_2$ and a relative refractive index $\Delta_2$ (which is relative to the refractive index $n_s$ of pure silica and denotes the refractive index change between pure silica and the first cladding portion 154a). The relative refractive index $\Delta_2$ comprises $(n_2 \ n_s)/n_s$. The cladding ring 155 comprises a refractive index $n_3$ and a relative refractive index $\Delta_3$ (which is relative to the refractive index $n_s$ of pure silica and denotes the refractive index change between pure silica and the cladding ring 155). The relative refractive index $\Delta_3$ comprises $(n_3 - n_s)/n_s$. The second cladding portion 154b comprises a refractive index $n_4$ and a relative refractive index $\Delta_4$ (which is relative to the refractive index $n_s$ of pure silica and denotes the refractive index change between pure silica and the second cladding portion 154b). The relative refractive index $\Delta_4$ comprises $(n_4 - n_s)/n_s$.

Further, $n_1 > n_3 > n_4 > n_2$ and $\Delta_1 > \Delta_3 > \Delta_4 > \Delta_2$. As stated above, the core 152 may be pure silica glass or glass doped with Cl, or K, or F for low loss. As non-limiting examples, the relative refractive index $\Delta_1$ may be from about −0.1 to about 0.2, for example, −0.1, −0.05, 0, 0.05, 0.1, 0.15, or the like. The first cladding portion 154a, the cladding ring 155 and the second cladding portion 154b may each comprise glass (e.g., silica glass) doped with F for lowering their respective refractive indices. As non-limiting examples, the relative refractive index $\Delta_2$ may be from about −0.2 to about −0.7, or the like, for example, −0.25, 0.3, 0.35, −0.45, −0.5, −0.55, −0.6, −0.65, or the like. As non-limiting examples, the relative refractive index $\Delta_3$ may be from about −0.1 to about −0.5, or the like, for example, −0.15, −0.2, −0.25, −0.3, −0.35, −0.4, −0.45, or the like. As non-limiting examples, the relative refractive index $\Delta_4$ may be from about −0.2 to about −0.6, or the like, for example, −0.25, 0.3, 0.35, −0.45, −0.5, −0.55, −0.6, or the like.

The dispersion compensating optical fiber link 150" comprises a refractive index change $\Delta'$ between the core 152 and the first cladding portion 154a of from about 0.2 to about 0.6, where $\Delta' = \Delta_1 - \Delta_2$. In some embodiments, the refractive index change $\Delta'$ may be from about 0.4 to about 0.5, for example, 0.25, 0.3, 0.35, 0.4, 0.41, 0.43, 0.45, 0.47, 0.49, 5, 5.5, or the like. The dispersion compensating optical fiber link 150" also comprises a refractive index change $\Delta''$ between the first cladding portion 154a and the cladding ring 155 of from about 0 and about 0.2 (i.e. the refractive index of the cladding ring 155 may be higher than the refractive index of the first cladding portion 154a), where $\Delta''=\Delta_3-\Delta_2$. In some embodiments, the refractive index change $\Delta''$ may be about 0.02, 0.05, 0.1, 0.12, 0.15, 0.18, or the like. Moreover, the dispersion compensating optical fiber link 150" comprises a refractive index change $\Delta'''$ between the first cladding portion 154a and the second cladding portion 154b of from about 0 to about 0.1 (i.e. the refractive index of the second cladding portion 154b may be higher than the refractive index of the first cladding portion 154a), where $\Delta'''=\Delta_4-\Delta_2$. In some embodiments, the refractive index change $\Delta'''$ may be about −0.02, −0.04, −0.05, −0.1, or the like.

The dispersion compensating optical fiber link 150" may comprise a cutoff wavelength of about 1600 nm or less, 1500 nm or less, 1350 nm or less, or the like, for example, 1550 nm, 1516 nm, 1500 nm, 1464 nm, 1450 nm, 1403 nm, 1400 nm, 1384 nm, 1350 nm, 1300 nm, 1250 nm, 1200 nm, 1150 nm, 1100 nm, 1050 nm, 1000 nm, 950 nm, 900 nm, 850 nm, 800 nm, or the like. Further, when one or more photons comprising a wavelength of about 1550 nm propagate along the dispersion compensating optical fiber link 150", the dispersion compensating optical fiber link 150" induces a mode field diameter of a photon comprising a wavelength of about 1550 nm of from about 8 µm to about 12 µm, for example, about 9 µm to about 11 µm, 9.5 µm to about 10.5 µm, or the like, such as 8 µm, 8.5 µm, 9 µm, 9.5 µm, 9.9 µm, 10 µm, 10.1 µm, 10.2 µm, 10.5 µm, 11 µm, 11.5 µm, 12 µm, or the like.

Further, in some embodiments, the when one or more photons comprising a wavelength of about 1550 nm propagate along the dispersion compensating optical fiber link 150", the dispersion compensating optical fiber link 150" induces an effective area of from about 50 µm² to about 100 µm², 60 µm² to about 90 µm², 70 µm² to about 80 µm², or the like, such as 50 µm², 55 µm², 60 µm², 65 µm², 70 µm², 73.5 µm², 74.3 µm², 75 µm², 76.8 µm², 78.7 µm², 80 µm², 85 µm², 90 µm², 95 µm², 100 µm², or the like. Further, when one or more photons comprising a wavelength of about 1550 nm propagate along the dispersion compensating optical fiber link 150", the dispersion compensating optical fiber link 150" induces dispersion at a absolute dispersion rate of about 9 ps/(nm)km or less, for example about 8.6 ps/(nm)km or less, 8.5 ps/(nm)km or less, 8 ps/(nm)km or less, 7.5 ps/(nm)km or less, 7 ps/(nm)km or less, 6.5 ps/(nm)km or less, 6 ps/(nm)km or less, 5.7 ps/(nm)km or less, 5.5 ps/(nm)km or less, 5 ps/(nm)km or less, 4.5 ps/(nm)km or less, 4.5 ps/(nm)km or less, 4 ps/(nm)km or less, 3.8 ps/(nm)km 3.6 ps/(nm)km or less, 3.5 ps/(nm)km or less, 3 ps/(nm)km or less, 2.5 ps/(nm)km or less, 2 ps/(nm)km or less, 1.5 ps/(nm)km or less, 1.1 ps/(nm)km, 1 ps/(nm)km or less, 0.5 ps/(nm)km or less, 0.1 ps/(nm)km or less, or the like.

In some embodiments, when one or more photons comprising a wavelength of about 1550 nm propagate along the dispersion compensating optical fiber link 150", the dispersion compensating optical fiber link 150" induces dispersion at a dispersion slope of from about 0.05 ps/(nm²)km to about 0.1 ps/(nm²)km, 0.055 ps/(nm²)km to about 0.085 ps/(nm²)km, or the like, such as about 0.0525 ps/(nm²)km, 0.055 ps/(nm²)km, 0.0564 ps/(nm²)km, 0.0575 ps/(nm²)km, 0.06 ps/(nm²)km, 0.0625 ps/(nm²)km, 0.0645 ps/(nm²)km, 0.065 ps/(nm²)km, 0.0675 ps/(nm²)km, 0.0676 ps/(nm²)km, 0.07 ps/(nm²)km, 0.0725 ps/(nm²)km, 0.075 ps/(nm²)km, 0.0775 ps/(nm²)km, 0.08 ps/(nm²)km, 0.0825 ps/(nm²)km, 0.0834 ps/(nm²)km, 0.085 ps/(nm²)km, or the like.

Moreover, when one or more photons comprising a wavelength of about 1550 nm propagate along the dispersion compensating optical fiber link 150", the dispersion compensating optical fiber link 150" induces attenuation at an attenuation rate of about 0.2 dB/Km or less, for example, about 0.18 dB/Km or less, such as about 0.17 dB/Km, 0.16 dB/Km, 0.15 dB/Km, 0.14 dB/Km, 0.13 dB/Km, 0.12 dB/Km, or the like.

Table 3, below, lists attributes of example dispersion compensating optical fiber links 150".

TABLE 3

|  | First Example Dispersion Compensating Optical Fiber Link 150" | Second Example Dispersion Compensating Optical Fiber Link 150" | Third Example Dispersion Compensating Optical Fiber Link 150" | Fourth Example Dispersion Compensating Optical Fiber Link 150" |
| --- | --- | --- | --- | --- |
| Core Material | Chlorine Doped Silica | Chlorine Doped Silica | Chlorine Doped Silica | Chlorine Doped Silica |
| Relative Refractive Index $\Delta_1$ | 0.15 | 0.15 | 0.15 | 0.15 |
| Relative Refractive Index $\Delta_2$ | −0.28 | −0.28 | −0.3 | −0.34 |
| Relative Refractive Index $\Delta_3$ | −0.15 | −0.16 | −0.15 | −0.34 |
| Relative Refractive Index $\Delta_4$ | −0.28 | −0.28 | −0.3 | −0.4 |
| Index Profile | Step | Step | Step | Step |
| Core Radius $R_{CORE}$ (µm) | 2.8 | 2.8 | 2.7 | 2.2 |
| First Cladding Portion Radius $R_{CLAD}$ (µm) | 8 | 8.8 | 4.5 | 8 |
| Cladding Ring Radius $R_{RING}$ (µm) | 11 | 11.4 | 11 | 9 |
| Cutoff Wavelength (nm) | 1516 | 1403 | 1464 | 1384 |
| Mode Field Diameter at 1550 nm (µm) | 10.2 | 9.9 | 10.1 | 9.9 |
| Effective Area at 1550 nm (µm²) | 78.7 | 73.5 | 76.8 | 74.3 |
| Absolute Dispersion Rate at 1550 nm (ps/(nm)km) | 3.8 | 4.5 | 3.8 | 3.5 |
| Dispersion Slope at 1550 nm (ps/(nm)km) | 0.0645 | 0.0564 | 0.0676 | 0.0834 |
| Attenuation Rate at 1550 nm (dB/Km) | 0.17 or less | 0.17 or less | 0.17 or less | 0.17 or less |

Figure 5A:
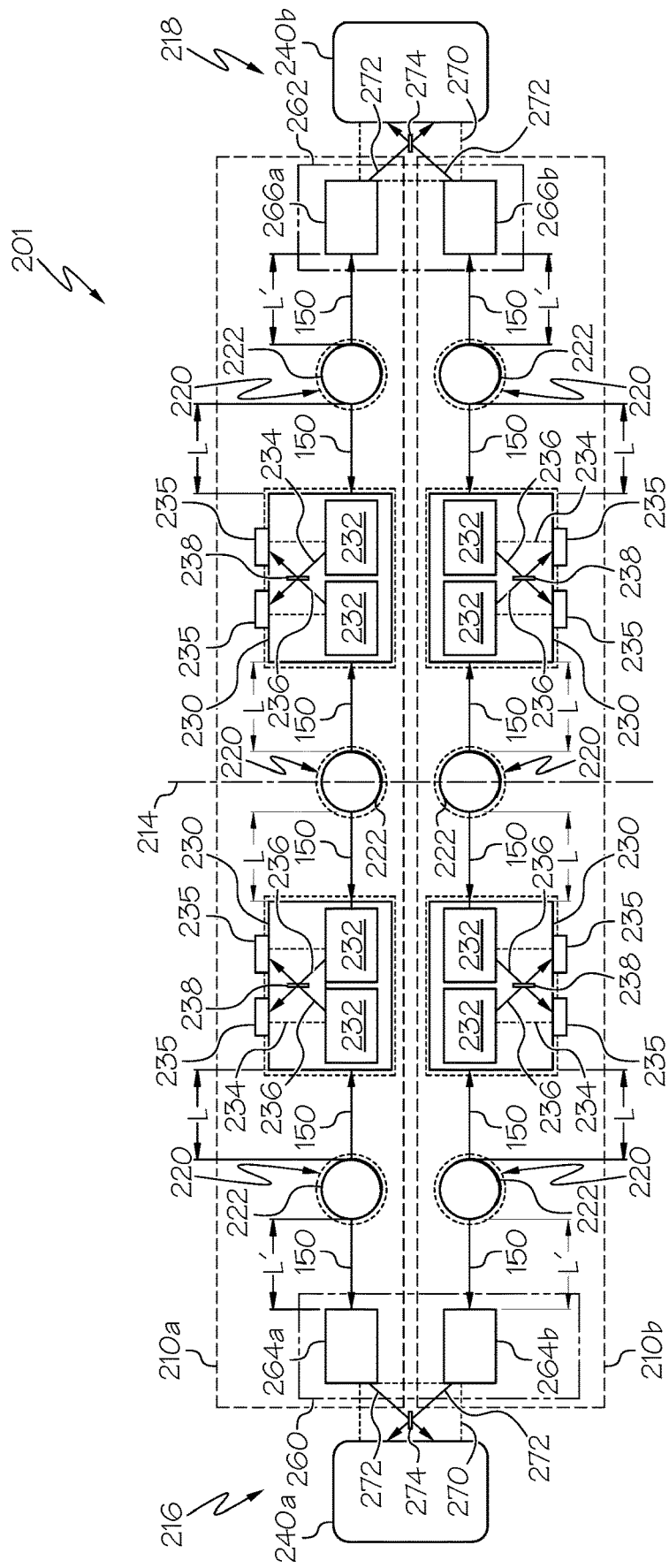
FIG. 5A schematically depicts a quantum key generation system having a photonic quantum bit generator comprising a quantum repeater, according to one or more embodiments shown and described herein.
Figure 5B:
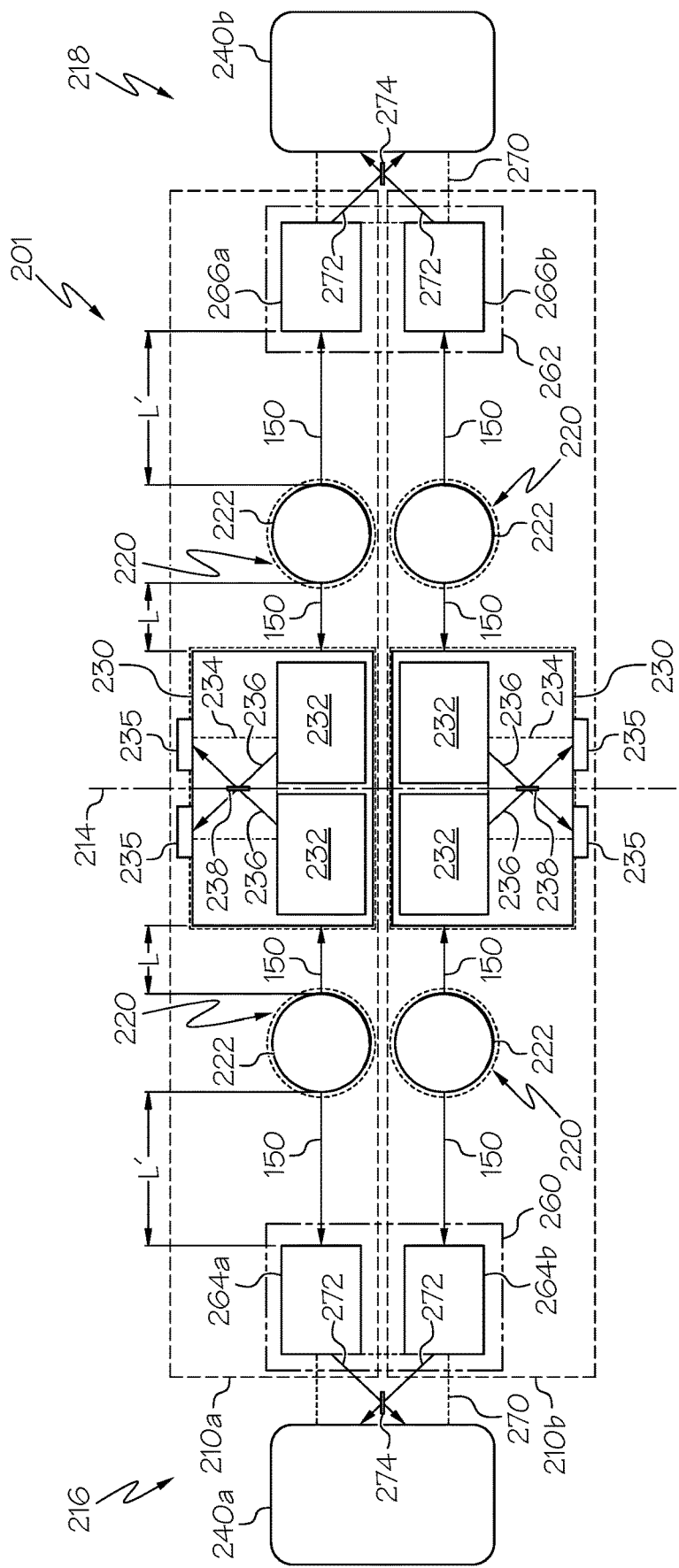
FIG. 5B schematically depicts a quantum key generation system having a photonic quantum bit generator comprising an entangled photon generator, according to one or more embodiments shown and described herein.
Figure 5C:
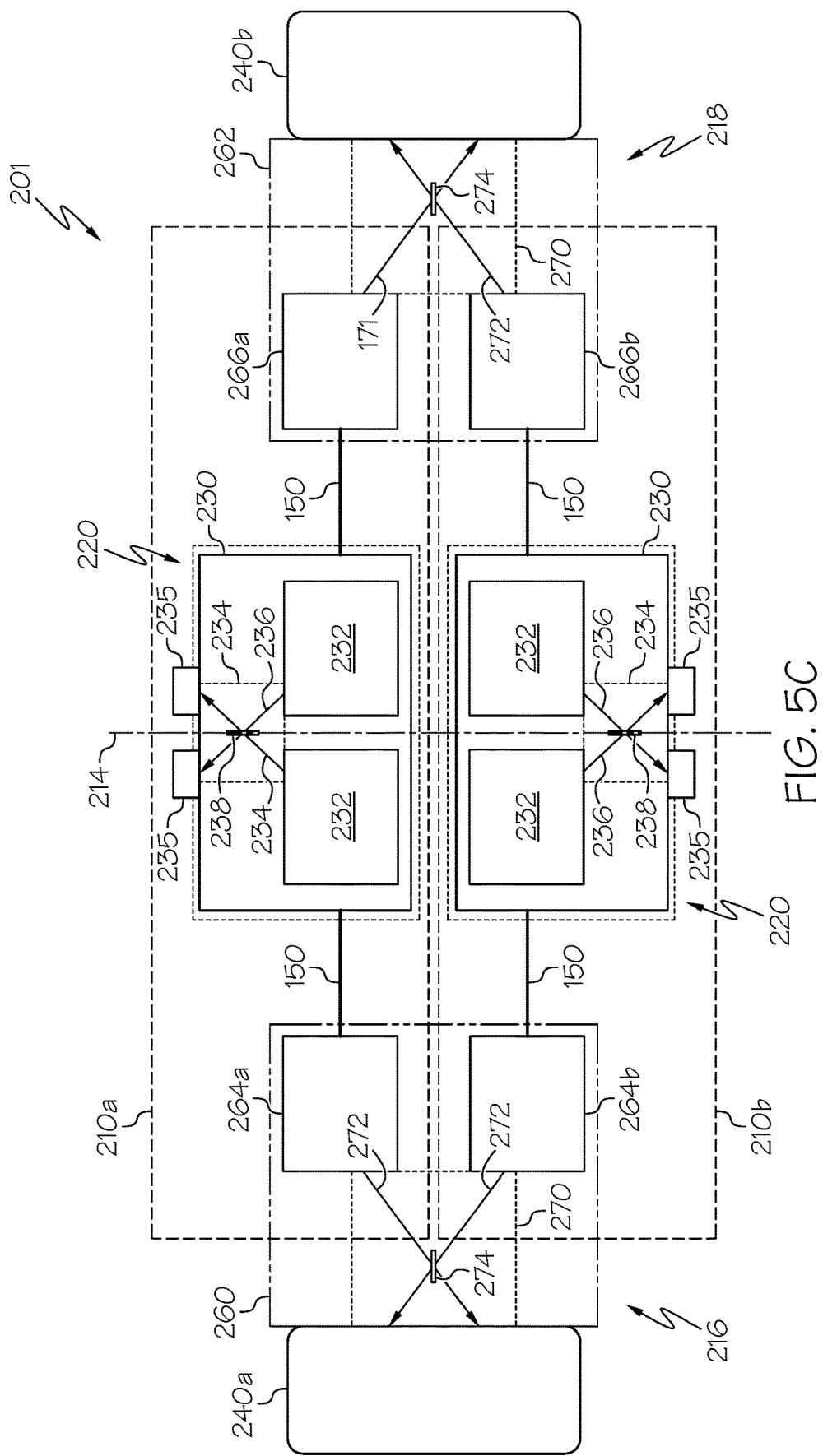
FIG. 5C schematically depicts another quantum key generation system having a photonic quantum bit generator comprising an entangled photon generator, according to one or more embodiments shown and described herein.
Figure 6:
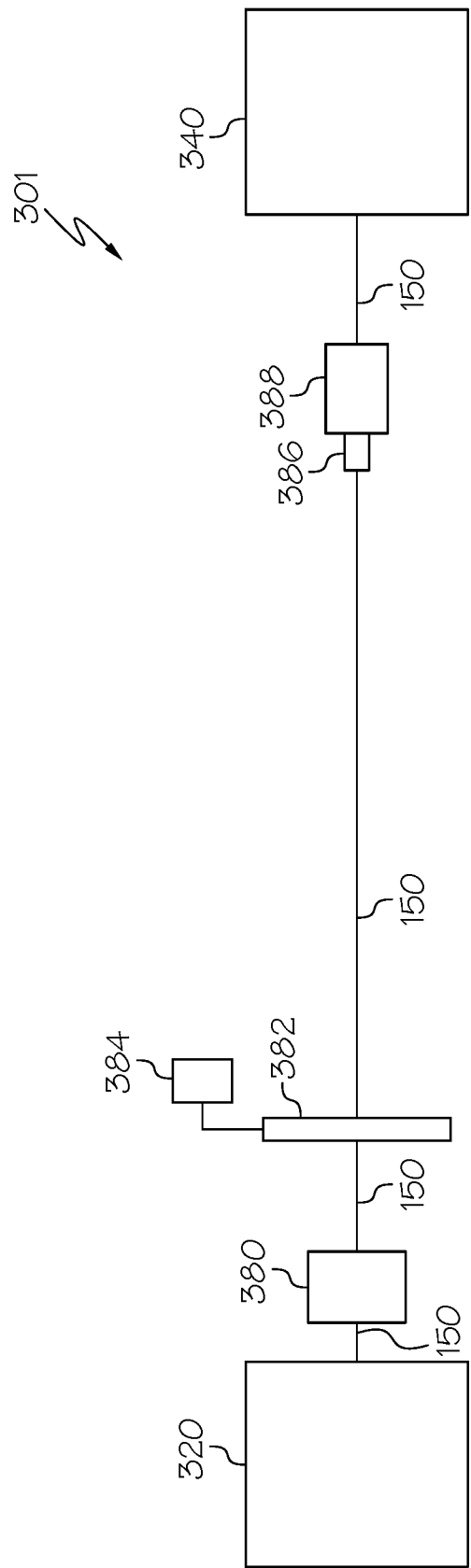
FIG. 6 schematically depicts a quantum key generation system configured to propagate quantum key bit information without photon entanglement, according to one or more embodiments shown and described herein.

Referring now to FIGS. 5A-5C, three embodiments of the quantum key generation system 201, each configured to propagate quantum key bit information using photon entanglement, are schematically depicted. Each of the embodiments of the quantum key generation system 201 comprise a plurality of dispersion compensating optical fiber links 150 extending between and optically coupling one or more photonic quantum bit generators 220 and the one or more photon detector units 240. Incorporating the dispersion compensating optical fiber links 150 may increase the quantum key bit rate of the quantum key generation system 201 because the dispersion compensating optical fiber links 150 induce a low absolute dispersion rate and a low attenuation rate of photons propagating through the dispersion compensating optical fiber links 150. In particular, the dispersion compensating optical fiber links 150 (e.g., the dispersion compensating optical fiber links 150' of FIGS. 3A and 3B and the dispersion compensating optical fiber links 150" of FIGS. 4A and 4B) are configured such that the quantum key bit information of the plurality of photons output by the one or more photonic quantum bit generators 220 is receivable at one or more photon detector units 240 at a bit rate of at least 10 Gbit/sec, for example, 20 Gbit/sec, 30 Gbit/sec, 40 Gbit/sec, 50 Gbit/sec, 75 Gbit/sec, 100 Gbit/sec, 150 Gbit/sec, 200 Gbit/sec, 250 Gbit/sec, 500 Gbit/sec, or the like.

Referring still to FIGS. 5A-5C, the quantum key generation system 201 comprises a first photon detector unit 240a, a second photon detector unit 240b and first and second photon entanglement chains 210a, 210b, each extending between the first photon detector unit 240a and the second photon detector unit 240b. The photon entanglement chains 210a, 210b each comprise at least one of the one or more photonic quantum bit generators 220 positioned between and optically coupled to the first photon detector unit 240a and the second photon detector unit 240b using dispersion compensating optical fiber links 150. The first and second photon entanglement chains 210a, 210b each comprise first and second terminating quantum memories 264a, 264b, 266a, 266b. The first terminating quantum memories 264a, 264b of each photon entanglement chain 210a, 210b are located at the first end 216 of each photon entanglement chain 210a, 210b and are optically coupled to the first photon detector unit 240a and the second terminating quantum memories 266a, 266b of each photon entanglement chain 210a, 210b are located at the second end 218 and are optically coupled to the second photon detector unit 240b. Further, the quantum key generation systems 201 are described in more detail in U.S. Pat. No. 9,313,180 titled "Systems and Methods for Quantum Key Generation" hereby incorporated by reference in its entirety and PCT Application No. PCT/US16/24854 titled "Systems and Methods for Quantum Key Generation," hereby incorporated by reference in its entirety.

Referring now to FIGS. 5A and 5B, in some embodiments, the one or more photonic quantum bit generators 220 may comprise one or more entangled photon generators 222 structurally configured to generate an entangled pair of photons, for example, using a parametric down conversion process. The entangled photon generators 222 may each comprise a laser source optically coupled to a non-linear crystal. In other embodiments, the entangled photon generators 222 may be structurally configured to generate an entangled pair of photons using a four-wave mixing process, or any method or process of generating an entangled pair of photons. Further, each entangled photon generator 222 may be structurally configured to provide entangled photons having any wavelength 2, for example, between about 800 and about 1800 nm, for example about 1550 nm.

As depicted in FIGS. 5A and 5B, each photon entanglement chain 210a, 210b may further comprise at least one quantum repeater 230 optically coupled to the one or more photonic quantum bit generators 220 (e.g., the one or more entangled photon generators 222). Each quantum repeater 230 is structurally configured to entangle a pair of photons. The quantum repeaters 230 of each photon entanglement chain 210a, 220b may be interleaved between the entangled photon generators 222 such that each entangled photon generator 222 is positioned between two quantum repeaters 230 or positioned between a single quantum repeater 230 and one of the terminating quantum memories 264a, 264b, 266a, 266b and each quantum repeater 230 is positioned between two entangled photon generators 222. As one example, in operation, an individual quantum repeater 230 may receive an individual entangled photons generated by two different entangled photon generators 222 and entangle the received photons. Further, in the embodiment depicted in FIG. 5A, an individual entangled photon generator 222 is positioned at an origination location 214 between the first end 216 and the second end 218 of each photon entanglement chain 210a, 210b and in the embodiment depicted in FIG. 5B, an individual quantum repeater 230 is positioned at the origination location between the first end 216 and the second end 218 of each photon entanglement chain 210a, 210b.

Referring still to FIGS. 5A and 5B, each quantum repeater 230 includes two quantum memories 232 and entanglement optics 234. The entanglement optics 234 may include two or more entangling pathways 236 optically coupled to and extending between the two quantum memories 232 and two entanglement detectors 235. In some embodiments, the two or more entangling pathways 236 may comprise waveguides, for example, the dispersion compensating optical fiber links 150, 150', 150", described above. Further, the entanglement detectors 235 may comprise single-photon detectors, e.g., superconducting nanowire single-photon detectors. The entanglement detectors 235 may also comprise low noise photodiodes. The entanglement optics 234 also include a beamsplitter 238 positioned such that each entangling pathway 236 traverses the beamsplitter 238. For example, a pair of Stokes photons or a pair of anti-Stokes photons output by the quantum memories 232 travel along the entangling pathways 236 and may traverse the beamsplitter 238.

While not intending to be limited by theory, in operation, each quantum memory 232 is configured to receive a photon (e.g., a photon output by an entangled photon generator 222 or another quantum repeater 230) and, via a non-linear optical process, absorb the photon thereby exciting an electron of the quantum memory 232 into an excited state. Then, after a period of time, the electron returns to a ground state and a photon (e.g., a Stokes photon or an anti-Stokes photon) is released. While not intending to be limited by theory, during this process of absorption and release of a photon by each quantum memory 232, the photon maintains its quantum properties, such as its coherence properties. Further the entanglement optics 234 are structurally configured to entangle pairs of photons when individual photons output by each quantum memory 232 (e.g., Stokes photons or anti-Stokes photons) simultaneously traverse the beamsplitter 238.

Referring now to FIG. 5C, in some embodiments, the one or more photonic quantum bit generators 220 may comprise one or more quantum repeaters 230 disposed between the first and second terminating quantum memories 264a, 264b, 266a, 266b of each photon entanglement chain 210a, 210b. While one quantum repeater 230 is disposed in each photon entanglement chain 210a, 210b depicted in the quantum key generation system 201 depicted in FIG. 5C, each photon entanglement chain 210a, 210b may comprise any number of quantum repeaters 230 adjacently positioned and optically coupled using dispersion compensating optical fiber links 150. While not intending to be limited by theory, the quantum repeaters 230 are configured to both entangle and output photons, for example, an individual quantum repeaters 230 may be optically coupled to additional quantum repeaters 230 and/or a terminating quantum memory 264a, 264b, 266a, 266b such that photons released by the quantum memories 232 of an individual quantum repeater 230 may be entangled via entanglement optics 234 then at least one of these released photons (e.g., Stokes or anti-Stokes photons) may be received by an adjacent quantum repeater 230 or a terminating quantum memory 264a, 264b, 266a, 266b. In the embodiment depicted in FIG. 5C in which the one or more photonic quantum bit generators 220 comprise quantum repeaters 230, each photon entanglement chain 210a, 220b may be structurally configured in the DLCZ protocol for quantum repeaters, as described in Duan et al., Nature, 414, 22 Nov. 2001, pgs 413-418 and as described in Sangouard et. al., "Quantum repeaters based on atomic ensembles and linear optics," Review of Modern Physics, Vol. 83, 2011, pgs 34-73.

As stated above with respect to FIG. 2, the dispersion compensating optical fiber links 150 may be configured to optimize the temporal pulse width of photon pulses propagating along the dispersion compensating optical fiber links 150. Referring again to FIGS. 5A-5C, the temporal pulse width of photons propagating along the dispersion compensating optical fiber links 150 may be controlled by the specific configuration of the dispersion compensating optical fiber link 150 such that two photons received by an individual quantum repeater 230 comprise the same or similar temporal pulse widths. This maximizes temporal overlap between photons output by the quantum memories 232 that traverse the beamsplitter 238, thereby improving an entanglement success rate of the individual quantum repeater 230. For example, broadening the temporal pulse width of each photon pulse without overlapping an adjacent photon pulse (e.g., without overlapping a second pulse within the same dispersion compensating optical fiber link 150) may increase the entanglement success rate of photons at the quantum repeater 230. For example, an overlap integral Φ can be used to mathematically quantify the entanglement swapping process at the quantum repeater 230 based on the temporal overlap of photons as they propagate through the beamsplitter 238, where $$\Phi = \frac{\int \varphi_{Phr1}(t)\varphi_{Phr2}(t)dt}{\int \varphi_{Phr1}(t)dt \int \varphi_{Phr2}(t)dt}, \varphi_{Phr1}$$

represents the pulse temporal profile of the first photon and $\varphi_{Phr2}$ represents the pulse temporal profile of the second photon. While not intending to be limited by theory, if Φ is 1, the entanglement swapping process is pure and the photons will be detected together at one of the entanglement detectors 235 and if Φ<1, the entanglement swapping process will not be pure and the purity of entanglement swapping process (e.g., the entanglement success rate) may be mathematically described by an entropy $\int=(0.5)\log_2(0.5\Phi))$. Simultaneous arrival of two photons having overlapping temporal pulse width and similar spectral widths (i.e. similar temporal and spectral pulse shapes) may cause the overlap integral Φ to be about 1. Using the dispersion compensating optical fiber links 150 described herein to optically couple components of the quantum key generation system 201 may improve the overlap integral Φ of the quantum repeaters 230 such that the overlap integral Φ approaches 1.

Referring again to FIGS. 5A-5C, the quantum key generation system 201 may comprise additional quantum repeaters 230 and/or additional entangled photon generators 222 positioned between the first end 216 and the second end 218. In the embodiments depicted in FIGS. 5A and 5B, the additional quantum repeaters 230 and the additional entangled photon generators 222 may be alternately disposed. Each additional quantum repeater 230 may be disposed between and optically coupled to adjacent entangled photon generator 222 using dispersion compensating optical fiber links 150. Each additional entangled photon generator may be disposed between and optically coupled to an additional quantum repeater 230 and one of another additional quantum repeater 230 or an individual terminating quantum memory 264a, 264b, 266a, 266b using dispersion compensating optical fiber links 150. Further, in the embodiment depicted in FIG. 5C, multiple quantum repeaters 230 may be optically coupled together between the first end 216 and the second end 218. Any number of additional quantum repeaters 230 and additional entangled photon generators 222 optically coupled using dispersion compensating optical fiber links 150 are contemplated to increase the length of the photon entanglement chains 210a, 210b, while minimizing signal attenuation along the photon entanglement chains 210a, 210b.

Additionally, the pair of dispersion compensating optical fiber links 150 that are optically coupled to any one individual quantum repeater 230 or entangled photon generator 222 may comprise substantially equivalent core lengths such that the individual quantum repeater 230 may simultaneously receive individual photons output by an adjacent quantum repeater 230 or entangled photon generator 222. In some embodiments, the pair of dispersion compensating optical fiber links 150 that are optically coupled to each individual quantum repeater 230 or entangled photon generator 222 positioned increasingly outward from the origination location 214 of each photon entanglement chain 210a, 210b may comprise increasingly lengthened core lengths, e.g., lengths L and L', where L'>L, as depicted in FIGS. 5A and 5B.

Thus, in operation, when entangled pairs of photons are simultaneously output by each photonic quantum bit generator 220 (e.g., the entangled photon generators 222 of FIGS. 5A and 5B or the quantum repeaters 230 of FIG. 5C), each quantum repeater 230 positioned increasingly outward from the origination location 214 of each photon entanglement chain 210a, 210b receives photons output by adjacent photonic quantum bit generators 220 after the quantum repeaters 230 positioned closer to the origination location 214 of each photon entanglement chain 210a, 210b receive and entangle photons. Accordingly, photons traveling in a direction away from the origination location 214 of each photon entanglement chain 210a, 210b become entangled while traversing the dispersion compensating optical fiber links 150. This generates a cascading chain of entanglement swapping such that photons received by the terminating quantum memories 264a, 264b, 266a, 266b at the first end 216 of an individual photon entanglement chain 210a, 210b are entangled, upon arrival, with photons received by the terminating quantum memories 264a, 264b, 266a, 266b at the second end 218 of the same photon entanglement chain 210a, 210b.

Referring still to FIGS. 5A-5C, the first and second terminating quantum memories 264a, 264b, 266a, 266b may be positioned at first and second ends 216, 218 of the photon entanglement chains 210a, 210b, respectively. The first and second terminating quantum memories 264a, 264b, 266a, 266b of each of the two photon entanglement chains 210a, 210b, form first and second cross-chain quantum repeaters 260, 262 including terminating entanglement optics 270 optically coupled to the first and second photon detector units 240a, 240b. The first and second cross-chain quantum repeaters 260, 262 may be structurally configured to generate measurable entangled particles and the first and the second photon detector units 240a, 240b may be structurally configured to receive the measurable entangled particles.

In some embodiments, the terminating entanglement optics 270 may comprise the same components as the entanglement optics 234 of the quantum repeaters 230 and may be positioned at the first end 216 and the second end 218 of the photon entanglement chains 210a, 210b. The terminating entanglement optics 270 comprise one or more entangling pathways 272 optically coupled to and extending between the terminating quantum memories 264a, 264b, 266a, 266b and the photon detector units 240a, 240b. In some embodiments, the one or more entangling pathways 272 may comprise waveguides, for example, the dispersion compensating optical fiber links 150, 150', 150", described above. The terminating entanglement optics 270 further comprise a beamsplitter 274 positioned such that each entangling pathway 272 traverses the beamsplitter 274. Further, the terminating entanglement optics 270 are structurally configured to entangle pairs of particles when particles output by the terminating quantum memories 264a, 264b, 266a, 266b simultaneously traverse the beamsplitter 274.

In operation, the cross-chain quantum repeaters 260, 262 entangle photons from each photon entanglement chain 210a, 210b. In operation, the first and second cross-chain quantum repeaters 260, 262 are structurally configured to receive photons output by the entangled photon generators 222 and/or the quantum repeaters 230 of each photon entanglement chain 210a, 210b, entangle the received photons, and generate a measurable entangled particle measureable by the photon detector units 240a, 240b. Accordingly, when the photons reach the first and the second terminating quantum memories 264a, 264b, 266a, 266b the photon arriving at the first terminating quantum memory 264a, 264b of a respective photon entanglement chain 210a, 210b, may be entangled with the photon arriving at the second terminating quantum memory 266a, 266b of the same photon entanglement chain 210a, 210b. Further, the cross-chain quantum repeaters 260, 262 are configured to entangled received photons and generate a measurable entangled particle using the same entanglement operation described above with respect to the quantum memories 232 described above.

Referring still to FIGS. 5A-5C, the first and the second photon detector units 240a, 240b are structurally configured to receive the measurable entangled particles generated by the first and second cross-chain quantum repeaters 260, 262, respectively. In some embodiments, each photon detector unit 240a, 240b comprises a pair of photon detectors positioned in optical alignment with the terminating quantum memories 264a, 264b, 266a, 266b, and/or the terminating entanglement optics 270 such that a particle generated by an individual terminating quantum memory 264a, 264b, 266a, 266b is received by an individual photon detector. Additionally, the photon detector units 240a, 240b may comprise one or more low noise photodiodes and/or one or more single-photon detectors, such as, for example, one or more superconducting nanowire single-photon detectors. In some embodiments, the photon detector units 240a, 240b may comprise the same detectors as the entanglement detectors 235a, 235b; however, any combination of detectors disposed in the quantum key generation system 201 is contemplated.

In operation, the measurable entangled particles generated by the first and the second cross-chain quantum repeaters 260, 262 are entangled by the terminating entanglement optics 270 such that each photon detector unit 240a, 240b measures a correlative entangled particle property of the measurable entangled particles. The measurable entangled particles received by each photon detector unit 240a, 240b share a quantum state such that measurement of a correlative entangled particle property at the first end 216 correlates with the measurement of a correlative entangled particle property at the second end 218. The correlative entanglement particle property may comprise any measurable quantum property of the measurable entangled particle, for example a linear polarization, a circular polarization, spin, translational momentum, orbital angular momentum, or the like.

The correlative entangled particle property measured by each photon detector unit 240a, 240b may be converted into a correlative quantum key bit. Each correlative quantum key bit may comprise a binary bit, e.g., a "1" bit or a "0" bit. In some embodiments, the correlative entangled particle property measured by each photon detector unit 240a, 240b may comprise a coordinate entangled particle property such that each correlative quantum key bit produced at each photon detector unit comprises a matching binary bit. For example, when the photon detector unit 240a measures a coordinate entanglement property that comprises a "0" bit, the photon detector unit 240b may also measures a coordinate entanglement property that comprises a "0" bit. In other embodiments, the correlative entangled particle property measured by each photon detector unit 240a, 140b comprises an orthogonal entangled particle property such that each correlative quantum key bit produced at each photon detector unit comprises an opposite binary bit. For example, when the photon detector unit 240a measures an orthogonal entanglement property that comprises a "0" bit, the photon detector unit 240b also measures an orthogonal entanglement property that comprises a "1" bit.

In some embodiments, the correlative entangled particle property may comprise any quantum information, for example, with or without converting the correlative entangled particle property into a correlative quantum key bit. For example, the photon entanglement chains 210a, 210b are structurally configured to communicate any quantum information between separate locations, for example, by generating particles comprising entangled quantum states and transmitting the entangled quantum states to and between separate locations. In some embodiments, the photon entanglement chains 210a, 210b may be structurally configured as a one-time key pad that operates to communicate quantum information. In a non-limiting example, the quantum communication may comprise any measurable quantum property of the measurable entangled particle, for example a linear polarization, a circular polarization, spin, translational momentum, orbital angular momentum, or the like.

Further, in operation, a plurality of iteratively converted correlative quantum key bits may form a quantum key at each photon detector unit 240a, 240b. For example, each photon detector unit 240a, 240b may convert iteratively received correlative quantum key bits into a set of correlative binary bits, such that each photon detector unit 240a and 240b may receive a quantum key correlated with the quantum key received by the other photon detector unit 240a, 240b. This allows the quantum key to be used as a cryptography key such that communication between the first end 216 and the second end 218 over classical communication channels (e.g., the signal channels 195 of the communications network 190 of FIG. 1) may be encrypted with the quantum key. Additionally, some embodiments may comprise electronic storage devices communicatively coupled to the photon detector units 240a, 240b and structurally configured to electronically store the correlative quantum key bits. In other embodiments, the photon detector units 240a, 240b may be structurally configured to electronically store the quantum key.

Referring now to FIG. 6, the quantum key generation system 301 is configured to propagate quantum key bit information without photon entanglement and comprises a photonic quantum bit generator 320 optically coupled to a photon detector unit 340 using one or more of the dispersion compensating optical fiber links 150 described above. Incorporating the dispersion compensating optical fiber links 150 may increase the quantum key bit rate of the quantum key generation system 301 because the dispersion compensating optical fiber links 150 induce a low absolute dispersion rate and a low attenuation rate of photons propagating through the dispersion compensating optical fiber links 150. In particular, the dispersion compensating optical fiber links 150 (e.g., the dispersion compensating optical fiber links 150' of FIGS. 3A and 3B and the dispersion compensating optical fiber links 150" of FIGS. 4A and 4B) are configured such that the quantum key bit information of the plurality of photons output by the photonic quantum bit generator 320 are receivable at the photon detector unit 340 at a bit rate of at least 10 Gbit/sec, for example, 20 Gbit/sec, 30 Gbit/sec, 40 Gbit/sec, 50 Gbit/sec, 75 Gbit/sec, 100 Gbit/sec, 150 Gbit/sec, 200 Gbit/sec, 250 Gbit/sec, 500 Gbit/sec, or the like.

The photonic quantum bit generator 320 may comprise a laser optically coupled to a modulator. The laser of the photonic quantum bit generator 320 may be configured to output a large number of photons at a faster bit rate than the entangled photon generators 222 and the quantum repeaters 230 of the quantum key generation system 201. The photon detector unit 340 may comprise one or more single-photon detectors, and/or one or more single-photon detectors, such as, for example, one or more superconducting nanowire single-photon detectors, carbon nanowire detectors, or the like. In operation, the quantum key generation system 301 may perform any know or yet to be developed non-entanglement based quantum communications protocols, such as the BB84 protocol, the E91 protocol, or the like.

Referring still to FIG. 6, the quantum key generation system 301 may further comprise an attenuator 380 optically coupled to the photonic bit generator 320, for example, positioned between and optically coupled to the photonic quantum key bit generator 320 and the photon detector unit 340. The attenuator 380 is structurally configured to attenuate a subset of the plurality of photons output by the photonic quantum bit generator 320. The quantum key generation system 301 may also include a polarizer 382, a polarization controller 384, a polarization maintaining connector 386, a phase modulator 388, or a combination thereof, each positioned between and optically coupled to the attenuator 380 and the photon detector unit 340. Each of these components may be optically coupled to adjacently positioned optical components and thereby optically coupled to the photonic key bit generator 320 and the photon detector unit 340 using the dispersion compensating optical fiber links 150 described above.

A primary application for technology disclosed herein is communication of quantum key bit information due at least in part to the nature and mechanics of quantum communication. However, as may well be understood from the above disclosure, other and/or additional information may well be communicated via technology disclosed herein, and claims and disclosure herein with respect to communication of quantum key bit information may be generalized to communication of information and quantum information.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A quantum communications system comprising:
   a quantum key generation system comprising a photonic quantum bit generator, a dispersion compensating optical fiber link, and a photon detector unit; and
   a communications network comprising a signal generator, a signal channel, and a signal receiver; wherein:
   the dispersion compensating optical fiber link extends between and optically couples the photonic quantum bit generator and the photon detector unit;
   the photonic quantum bit generator is structurally configured to output a plurality of photons each comprising quantum key bit information;
   the photon detector unit is structurally configured to receive the quantum key bit information of the plurality of photons;
   the signal channel extends between and communicatively couples the signal generator and the signal receiver;
   the signal generator is structurally configured to output a signal comprising one or more signal bits;
   the signal receiver is communicatively coupled to the photon detector unit and is structurally configured to compare the one or more signal bits with the quantum key bit information upon receipt of the signal; and
   the dispersion compensating optical fiber link comprises a core and a cladding surrounding the core and is structurally configured to induce dispersion of a photon comprising a wavelength of about 1550 nm at an absolute dispersion rate of about 9 ps/(nm)km or less and induce attenuation of the photon comprising the wavelength of about 1550 nm at an attenuation rate of about 0.18 dB/Km or less such that the quantum key bit information of the plurality of photons output by the photonic quantum bit generator is receivable at the photon detector unit at a bit rate of at least about 10 Gbit/sec; wherein:
   the cladding comprises a first cladding portion, a second cladding portion, and a cladding ring disposed between the first cladding portion and the second cladding portion; and
   the core comprises a relative refractive index $\Delta_1$, the first cladding portion comprises a relative refractive index $\Delta_2$ and the cladding ring comprises a relative refractive index $\Delta_3$, where $\Delta_1 > \Delta_3 > \Delta_2$.

2. The quantum communications system of claim 1, wherein the core comprises a radius of from about 2.2 μm to about 3 μm.

3. The quantum communications system of claim 1, wherein the core of the dispersion compensating optical fiber link comprises a relative refractive index $\Delta_1$ of from about −0.1 to about 0.2, where:
   $\Delta_1$ comprises $(n_1 - n_s)/n_s$;
   $n_1$ comprises a refractive index of the core; and
   $n_s$ comprises a refractive index of pure silica.

4. The quantum communications system of claim 1, wherein the first cladding portion of the dispersion compensating optical fiber link comprises a relative refractive index $\Delta_2$ of from about −0.2 to about −0.7, where:
   $\Delta_2$ comprises $(n_2 - n_s)/n_s$;
   $n_2$ comprises a refractive index of the cladding; and
   $n_s$ comprises a refractive index of pure silica.

5. The quantum communications system of claim 1, wherein the dispersion compensating optical fiber link comprises a cutoff wavelength of about 1200 nm or less, wherein the dispersion compensating optical fiber link comprises a mode field diameter of from about 7.5 μm to about 9.0 μm, wherein the dispersion compensating optical fiber link comprises an effective area of from about 40 μm² to about 55 μm², and wherein the dispersion compensating optical fiber link comprises a dispersion slope of from about 0.051 ps/(nm²)km to about 0.054 ps/(nm²)km.

6. The quantum communications system of claim 1, wherein the quantum key generation system further comprises an attenuator optically coupled to the photonic quantum bit generator and structurally configured to attenuate a subset of the plurality of photons output by the photonic quantum bit generator.

7. The quantum communications system of claim 1, wherein:
   the photon detector unit comprises a first photon detector unit;
   the quantum key generation system further comprises a second photon detector unit and two photon entanglement chains, extending between the first photon detector unit and the second photon detector unit; and
   each photon entanglement chain comprises at least one photonic quantum bit generator and first and second terminating quantum memories optically coupled to the first photon detector unit and the second photon detector unit, respectively.

8. The quantum communications system of claim 7, wherein the at least one photonic quantum bit generator of each photon entanglement chain comprises a quantum repeater, wherein the quantum repeater comprises:
   two quantum memories and entanglement optics;
   the entanglement optics comprise two or more entangling pathways optically coupled to and extending between the two quantum memories and two entanglement detectors;
   the entanglement optics comprise a beamsplitter positioned such that each entangling pathway traverses the beamsplitter; and
   the entanglement optics are structurally configured to entangle pairs of particles when particles output by the quantum memories simultaneously traverse the beamsplitter.

9. The quantum communications system of claim 7, wherein the at least one photonic quantum bit generator of each photon entanglement chain comprises an entangled photon generator, wherein each photon entanglement chain further comprises one or more quantum repeaters optically coupled to the entangled photon generator.

10. The quantum communications system of claim 7, wherein the first and second terminating quantum memories are positioned at first and second ends of the photon entanglement chains, respectively;
   the first and second terminating quantum memories of each of the two photon entanglement chains form first and second cross-chain quantum repeaters respectively, to generate measurable entangled particles at the cross-chain quantum repeaters; and
   the first and the second photon detector units are structurally configured to receive the measurable entangled particles generated by the first and second cross-chain quantum repeaters, respectively.

11. The quantum communications system of claim 1, wherein the dispersion compensating optical fiber link is structurally configured such that the quantum key bit information of the plurality of photons output by the photonic quantum bit generator is receivable at the photon detector unit at a bit rate of at least about 50 Gbit/sec.

12. The quantum communications system of claim 1, wherein the dispersion compensating optical fiber link is structurally configured such that the quantum key bit information of the plurality of photons output by the photonic quantum bit generator is receivable at the photon detector unit at a bit rate of at least about 100 Gbit/sec.

13. The quantum communications system of claim 1, wherein the second cladding portion comprises a relative refractive index $\Delta_4$ and $\Delta_1 > \Delta_3 > \Delta_2 > \Delta_4$.

14. A quantum key generation system comprising:
a dispersion compensating optical fiber link extending between and optically coupling a photonic quantum bit generator and a photon detector unit, wherein:
the dispersion compensating optical fiber link comprises a core and a cladding surrounding the core and is structurally configured to induce dispersion of a photon comprising a wavelength of about 1550 nm at an absolute dispersion rate of about 9 ps/(nm)km or less and induce attenuation of the photon comprising the wavelength of about 1550 nm at an attenuation rate of about 0.18 dB/Km or less such that quantum key bit information of a plurality of photons output by the photonic quantum bit generator is receivable at the photon detector unit at a bit rate of at least about 10 Gbit/sec;
the cladding comprises a first cladding portion, a second cladding portion, and a cladding ring disposed between the first cladding portion and the second cladding portion; and
the core comprises a relative refractive index $\Delta_1$, the first cladding portion comprises a relative refractive index $\Delta_2$ and the cladding ring comprises a relative refractive index $\Delta_3$, where $\Delta_1 > \Delta_3 > \Delta_2$.

15. The quantum key generation system of claim 14, wherein the core comprises silica glass, wherein the silica glass of the core is doped with K, Cl, F, or a combination thereof.

16. The quantum key generation system of claim 15, wherein the core comprises a radius of from about 2.2 µm to about 3 µm.

17. A quantum key generation system comprising
two photon entanglement chains,
a plurality of dispersion compensating optical fiber links; and
two photon detector units; wherein:
each photon entanglement chain extends between the two photon detector units;
each photon entanglement chain comprises at least one photonic quantum bit generator and first and second terminating quantum memories optically coupled using the plurality of dispersion compensating optical fiber links;
the first and second terminating quantum memories are positioned at first and second ends of the photon entanglement chains, respectively;
the first and second terminating quantum memories of each of the two photon entanglement chains form first and second cross-chain quantum repeaters, respectively, to generate measurable entangled particles at the cross-chain quantum repeaters, and
the first and the second photon detector units are structurally configured to receive the measurable entangled particles generated by the first and second cross-chain quantum repeaters, respectively;
the plurality of dispersion compensating optical fiber links comprise a core and a cladding surrounding the core;
the cladding comprises a first cladding portion, a second cladding portion, and a cladding ring disposed between the first cladding portion and the second cladding portion; and
the core comprises a relative refractive index $\Delta_1$, the first cladding portion comprises a relative refractive index $\Delta_2$ and the cladding ring comprises a relative refractive index $\Delta_3$, where $\Delta_1 > \Delta_3 > \Delta_2$.

18. The quantum key generation system of claim 17, wherein:
the plurality of dispersion compensating optical fiber links are structurally configured to induce dispersion of a photon comprising a wavelength of about 1550 nm at an absolute dispersion rate of about 9 ps/(nm)km or less and induce attenuation of the photon comprising the wavelength of about 1550 nm at an attenuation rate of about 0.18 dB/Km or less such that quantum key bit information of a plurality of photons output by each photonic quantum bit generator is receivable at the first or second photon detector unit at a bit rate of at least approximately 10 Gbit/sec.

19. The quantum key generation system of claim 18, wherein the plurality of dispersion compensating optical fiber links are structurally configured such that quantum key bit information of a plurality of photons output by each photonic quantum bit generator is receivable at the first or second photon detector unit at a bit rate of at least about 50 Gbit/sec.

20. The quantum key generation system of claim 18, wherein the plurality of dispersion compensating optical fiber links are structurally configured such that quantum key bit information of a plurality of photons output by each photonic quantum bit generator is receivable at the first or second photon detector unit at a bit rate of at least about 100 Gbit/sec.

\* \* \* \* \*

UNITED STATES PATENT AND TRADEMARK OFFICE
CERTIFICATE OF CORRECTION

PATENT NO. : 11,218,226 B2  
APPLICATION NO. : 16/557059  
DATED : January 4, 2022  
INVENTOR(S) : Ming-Jun Li et al.

Page 1 of 1

It is certified that error appears in the above-identified patent and that said Letters Patent is hereby corrected as shown below:

On the Title Page

On the Page 2, in Column 2, under "Other Publications", Line 34, delete "dirstibution" and insert -- distribution --.

Signed and Sealed this  
Nineteenth Day of April, 2022

Katherine Kelly Vidal  
*Director of the United States Patent and Trademark Office*